United States Patent
Zhang et al.

(10) Patent No.: US 10,733,929 B2
(45) Date of Patent: Aug. 4, 2020

(54) INTEGRATED CIRCUIT, MOBILE PHONE AND DISPLAY

(71) Applicants: Kunshan New Flat Panel Display Technology Center Co., Ltd., Kunshan, Jiangsu (CN); KunShan Go-Visionox Opto-Electronics Co., Ltd, Kunshan, Jiangsu (CN)

(72) Inventors: Tingting Zhang, Jiangsu (CN); Yanqian Song, Jiangsu (CN); Siming Hu, Jiangsu (CN); Hui Zhu, Jiangsu (CN); Li Lin, Jiangsu (CN)

(73) Assignees: Kunshan New Flat Panel Display Technology Center Co., Ltd., Kunshan, Jiangsu (CN); Kunshan Go-Visionox Opto-Electronics Co., Ltd., Kunshan, Jiangsu (CN)

( * ) Notice: Subject to any disclaimer, the term of this patent is extended or adjusted under 35 U.S.C. 154(b) by 0 days.

(21) Appl. No.: 16/322,071

(22) PCT Filed: Jan. 5, 2018

(86) PCT No.: PCT/CN2018/071494
§ 371 (c)(1),
(2) Date: Jan. 30, 2019

(87) PCT Pub. No.: WO2018/127114
PCT Pub. Date: Jul. 12, 2018

(65) Prior Publication Data
US 2019/0318681 A1    Oct. 17, 2019

(30) Foreign Application Priority Data
Jan. 6, 2017  (CN) .......................... 2017 1 0009707

(51) Int. Cl.
*G09G 3/20* (2006.01)
*H04M 1/02* (2006.01)

(52) U.S. Cl.
CPC ... *G09G 3/2092* (2013.01); *G09G 2300/0426* (2013.01); *G09G 2310/0272* (2013.01);
(Continued)

(58) Field of Classification Search
CPC ... G09G 2300/0426; G09G 2310/0272; G09G 2310/0297; G09G 2320/0223;
(Continued)

(56) References Cited

U.S. PATENT DOCUMENTS 6,333,729 B1 * 12/2001 Ha ...................... G09G 3/3688
345/98
7,505,017 B1 * 3/2009 Yeo ..................... G09G 3/3688
345/87

(Continued)

FOREIGN PATENT DOCUMENTS

CN    1637793 A    7/2005
CN    1658262 A    8/2005
(Continued)

OTHER PUBLICATIONS

Extended Search Report issued in European Patent Application No. 18736168.8, dated Jul. 3, 2019.

*Primary Examiner* — Dmitriy Bolotin
(74) *Attorney, Agent, or Firm* — BakerHostetler

(57) ABSTRACT

An integrated circuit, a mobile phone and a display are provided with the integrated circuit. The integrated circuit includes a substrate, a data distributor and a data driver distributed on the substrate. A power line trace gap is provided within the data distributor; a first data line connected to the data driver and to the data distributor; and a (Continued)

first power line connected to the data driver and passing through the power line trace gap.

10 Claims, 3 Drawing Sheets

(52) U.S. Cl.
CPC ............... *G09G 2310/0297* (2013.01); *G09G 2320/0223* (2013.01); *G09G 2330/02* (2013.01); *H04M 1/0202* (2013.01)

(58) Field of Classification Search
CPC .... G09G 2330/02; G09G 3/20; G09G 3/2092; H04M 1/0202
See application file for complete search history.

(56) References Cited

U.S. PATENT DOCUMENTS

| | | | | |
|---|---|---|---|---|
| 7,884,786 | B2* | 2/2011 | Kim | ............... G09G 3/3233 345/83 |
| 10,056,052 | B2* | 8/2018 | Shin | ............... G09G 3/3688 |
| 2005/0116919 | A1* | 6/2005 | Shin | ............... G09G 3/325 345/100 |
| 2005/0117410 | A1* | 6/2005 | Shin | ............... G09G 3/325 365/189.09 |
| 2005/0117611 | A1* | 6/2005 | Shin | ............... G09G 3/325 370/536 |
| 2005/0140666 | A1* | 6/2005 | Shin | ............... G09G 3/3283 345/211 |
| 2006/0107143 | A1* | 5/2006 | Kim | ............... G09G 3/3233 714/726 |

FOREIGN PATENT DOCUMENTS

| | | |
|---|---|---|
| CN | 101131805 A | 2/2008 |
| CN | 103839516 A | 6/2014 |
| CN | 103903557 A | 7/2014 |
| CN | 104778912 A | 7/2015 |
| CN | 105551435 A | 5/2016 |
| CN | 106066560 A | 11/2016 |
| CN | 106257571 A | 12/2016 |
| CN | 106847151 A | 6/2017 |
| EP | 1647967 A1 | 4/2006 |
| JP | 2011-90244 A | 5/2011 |
| KR | 1020060032828 A | 4/2006 |
| TW | 201428385 A | 7/2014 |
| TW | 201528238 A | 7/2015 |
| TW | 201535222 A | 9/2015 |

* cited by examiner

INTEGRATED CIRCUIT, MOBILE PHONE AND DISPLAY

CROSS-REFERENCE TO RELATED APPLICATION

This application is a National Stage of International patent application PCT/CN2018/071494, filed on Jan. 5, 2018, which claims priority to foreign Chinese patent application No. CN 201710009707.2, filed on Jan. 6, 2017, the disclosures of which are incorporated by reference in their entirety.

TECHNICAL FIELD

This application relates to circuit technical field, particularly to an integrated circuit, a mobile phone and a display provided with the integrated circuit.

BACKGROUND

An integrated circuit, also known as a microcircuit, microchip or chip, is a microelectronic device or component. An integrated circuit is a micro-structure having required circuit functions, formed by using a certain process to interconnect the elements and circuits required in a circuit on one or several substrates.

The integrated circuit can be applied to devices in the field of military, communication, remote control, and the like. Taking an integrated circuit applied to a mobile phone as an example, as shown in FIG. 1, a data distributor 2 (DEMUX, also referred to as a demultiplexer), a data driver 3, and a power line 4 and a data line 5 connected to the data driver 3 are integrated on the substrate 1. Here, the data line 5 is used to transmit data signals. The data distributor 2 is used to distribute the signals transmitted by the data line 5 into multipath signals, so that it is possible to ensure fewer data lines connected to the data driver 3. The power line 4 is used to transfer power to supply power to the data driver 3.

Generally, after the power line 4 is drawn out of the data driver 3, it is necessary to make the power line bypass the data distributor 2, so as to extend to other areas of the substrate 1 to supply power to devices in other areas. However, this causes the parasitic capacitance across the data line 5 to be large, so that the transmission of the data signal can be blocked, which results in delay of the data signal.

SUMMARY

The embodiments of the present application provide an integrated circuit to solve the technical problem in the prior art that the parasitic capacitance on the data line is so large such that the data signal may be delayed.

The embodiments of the present application also provide a mobile phone and a display to solve the technical problem in the prior art that the parasitic capacitance on the data line is so large such that the data signal can be delayed.

The following technical solution can be adopted by the embodiments of the present application.

An integrated circuit of the present application comprises a substrate, a data distributor and a data driver distributed on the substrate, wherein the data distributor having a power line trace gap provided therein; a first data line connected to the data driver and the data distributor; and a first power line connected to the data driver and passing through the power line trace gap.

Optionally, the data distributor comprises a plurality of functional sub-distributors distributed on the substrate and connected to the first data line, wherein two adjacent functional sub-distributors are connected to each other by wires embedded on the substrate, and the power line trace gap is provided between two adjacent functional sub-distributors.

Optionally, the two adjacent functional sub-distributors have a gap defined therebetween, wherein the gap comprises the power line trace gap and a vacant gap which is not provided with the first power line, wherein a width of the power line trace gap is larger than that of the vacant gap.

Optionally, a width of a first vacant gap adjacent to the power line trace gap is less than a width of a second vacant gap spaced apart from the power line trace gap by at least one of the first gap; or the width of respective vacant gap is the same.

Optionally, a sum of a width of a single power line trace gap and a width of a single first vacant gap is twice of a width of a single second vacant gap, when the width of the first vacant gap is less than the width of the second vacant gap.

Optionally, the first power line is configured to linearly extend and pass through the data distributor after being drawn from the data driver.

Optionally, at least two first power lines are provided, and are configured to be integrated into one second power line after passing through the data distributor.

Optionally, the integrated circuit further comprises a plurality of second data lines connected to the data distributor and intersected with scan lines of the integrated circuit, wherein the second data line each comprises a second data line portion linearly extending, the gaps between two adjacent second data line portions are the same.

A mobile phone of the present application comprises a housing and an integrated circuit provided within the housing, wherein the integrated circuit is any one of the integrated circuit mentioned above.

A display of the present application comprises a housing and an integrated circuit provided within the housing, wherein the integrated circuit is any one of the integrated circuit mentioned above.

The following advantageous effects can be achieved by at least one of the technical solutions adopted by the embodiments of the present application:

In the technical solution adopted by the embodiment of the present application, a data distributor, a data driver, a first data line and a first power line are embedded on the substrate, wherein the first power line passes through a power line trace gap within the data distributor. In this way, the length of the intersection of the first data line and the first power line can be decreased. Since the intersection area of the first data line and the first power line has a parasitic capacitance, when the intersection area of the first data line and the first power line decreases, the parasitic capacitance accumulated to the first data line can be correspondingly reduced, therefore the hindrance of the parasitic capacitance of the first data line to the data signal can be reduced, thereby the delay of the data signal can be reduced. Thus, the present application proposes a technical solution that the parasitic capacitance of the data lines can be reduced, thereby reducing the delay of the data signals.

BRIEF DESCRIPTION OF THE DRAWINGS

Accompanying drawings illustrated here are used for providing further understanding of the present application. The drawings form a part of the application. Exemplary embodiments of the present application and the description thereof are intended to interpret the present application rather than improperly limit the present application. In the drawings.

DETAILED DESCRIPTION OF PREFERRED EMBODIMENTS

In order to make the purpose, the technical solution and advantages of the present application more clear, the technical solution of the present application will be described clearly and completely in the following with reference to the specific embodiments and the corresponding drawings. Obviously, the described embodiments are merely a part of the embodiments of the present application rather than all of the embodiments. Based on the embodiments in the present application, all the other embodiments obtained by a person skilled in the art without creative work will fall into the protection scope of the present application.

Figure 1:
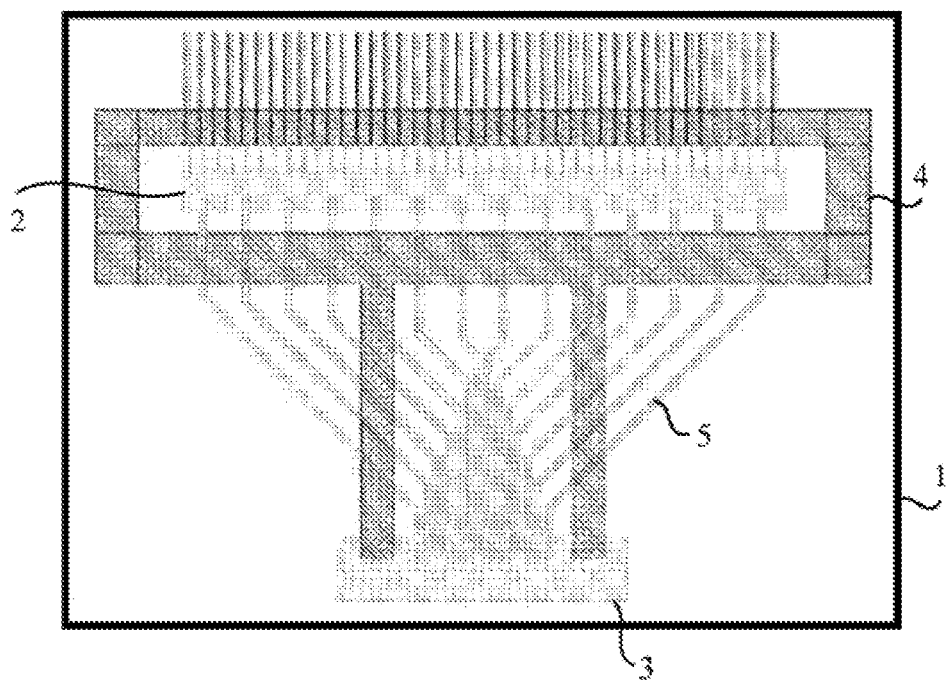
FIG. 1 is a structural schematic view of an integrated circuit in the prior art.
Figure 2:
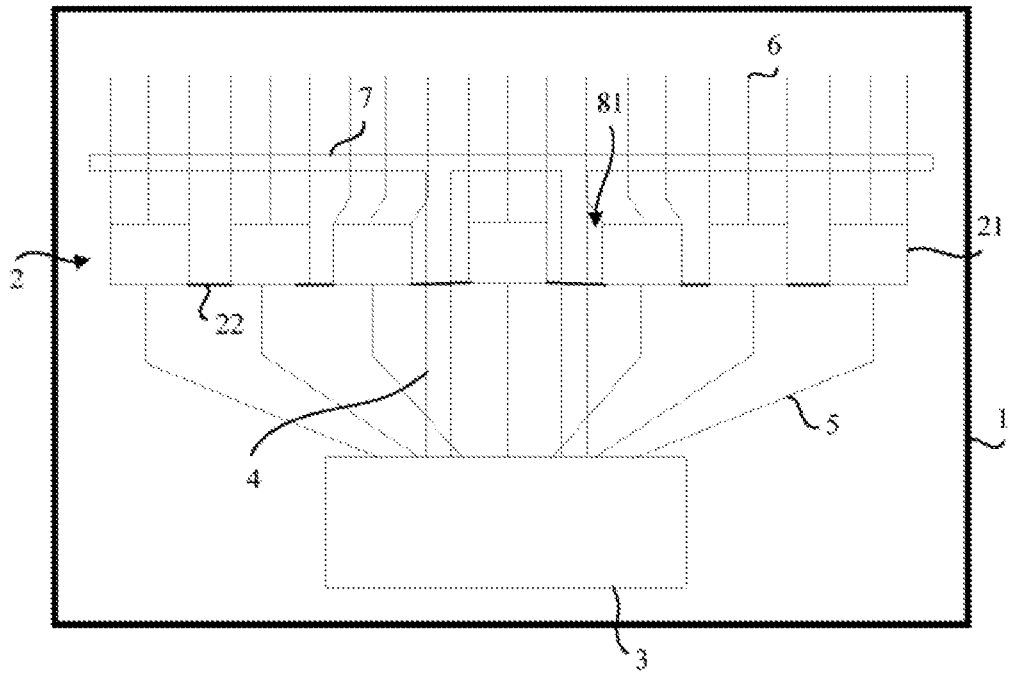
FIG. 2 is a structural schematic view of the first kind of integrated circuit provided by the embodiments of the present application.

Refer to FIG. 2, the integrated circuit of the present application includes a substrate 1, a data distributor 2, a data driver 3, a first power line 4, a plurality of first data lines 5, and a plurality of second data lines 6 respectively distributed on the substrate 1. The substrate 1 have multiple layers, the first data lines 5 and the second data lines 6 may be located on the same layer, the first data lines 5 and the first power line 4 are located on different layers, the layer on which the data lines 5 is located and the layer on which the first power line 4 is located may be spaced by an insulating layer, the data distributor 2 and the data driver 3 are respectively passing through the layer on which the data lines 5 is located and the layer on which the first power line 4 is located.

Each of the first data lines 5 is connected to the data driver 3, and the data driver 3 is configured to drive the first data line 5, transmit the data signal to the first data line 5, and transmit the data signal through the first data line 5. The data distributor 2 is connected to the first data line 5 and the second data line 6 for shunting the data signal transmitted by the first data line 5 and transmitting the shunted data signal to the second data line 6. The second data line 6 is disposed across the scan line (not shown) of the integrated circuit.

Figure 3:
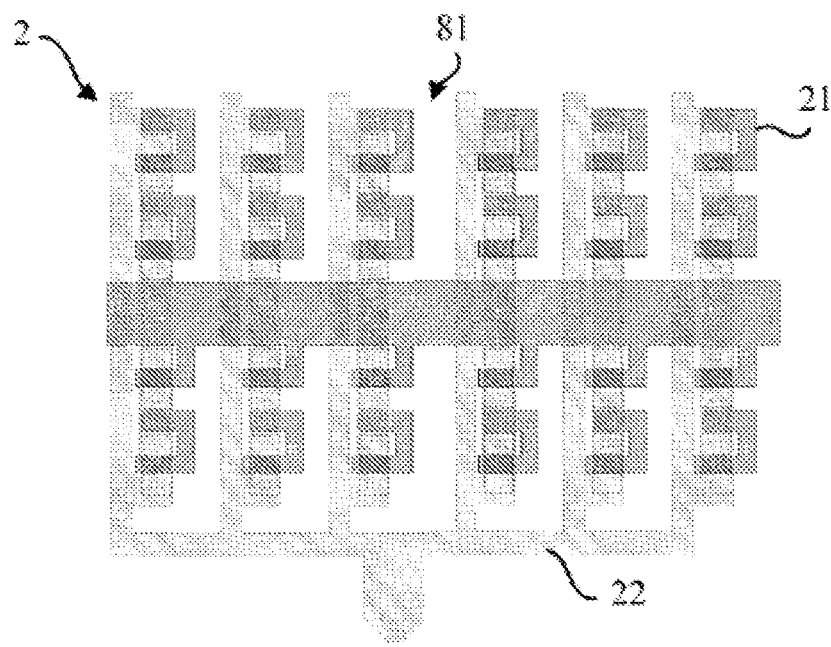
FIG. 3 is a structural schematic view of the data distributor provided by the embodiments of the present application.

As can be seen in FIGS. 2 and 3, a power line trace gap 81 is provided in the data distributor 2. The first power line 4 passes through the power line trace gap 81 after being drawn from the data driver 3. The first power line 4 may be provided with at least two power lines, and each of the first power lines 4 is located in a different power line trace gaps 81, that is, one of the first power line 4 is disposed in one power line trace gap 81. Each of the first power lines 4 can be integrated into a second power line 7 after passing through the data distributor 2, so that the extension direction of the second power line 7 can be substantially parallel to the extension direction of the data driver 3, so as to facilitate the arrangement of other power lines connected to the second power line 7 (other power lines except the first power line 4).

The first power line 4 passes through the power line trace gap 81 without bypassing the data distributor 2. This has little effect on a design of the first power line 4, and has little effect on the resistance voltage drop of the first power line 4; the length of a intersection of the first data line 5 and the first power line 4 can be reduced. Thereby, the parasitic capacitance of the first data line 5 can be reduced, in turn, the delay of the data signal can be reduced.

Figure 4:
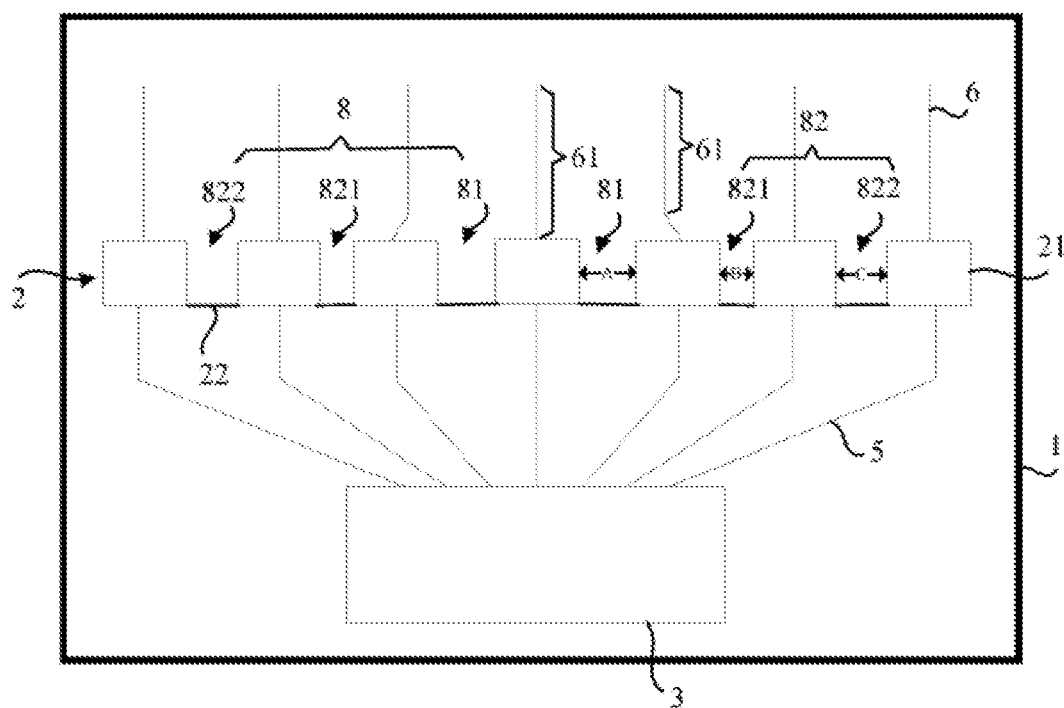
FIG. 4 is a structural schematic view of the integrated circuit provided by the embodiments of the present application with the power line removed.

In a specific embodiment, as can be seen in FIG. 4, the data distributor 2 includes a plurality of functional sub-distributors 21 distributed on the substrate 1, and two adjacent functional sub-distributors 21 are connected by wires 22 embedded in the substrate 1. The plurality of functional sub-distributors 21 are disposed in a row, and its orientation is substantially parallel to the extension direction of the data driver 3. Each functional sub-distributor 21 is connected to a part of first data lines 5 and a part of second data lines 6. The function of each functional sub-distributor 21 can be specifically set according to requirements.

A certain gap 8 is left between two adjacent functional sub-distributor 21. The gap 8 includes a power line trace gap 81, that is, a power line trace gap 81 is disposed between two adjacent functional sub-distributors 21 to facilitate disposing the power line trace gap 81. The first power line 4 can linearly extend and pass through the data distributor 2 after being drawn from the data driver 3 in the process of arranging the power line trace gap 81, therefore the length of the first power line 4 can be further decreased and the length of the intersection of the first power line 5 and the first data line 4 can be decreased.

Under normal conditions, the number of the first power lines 4 drawn from the data driver 3 is generally not more than three, and the number of the functional sub-distributors 21 is more than ten. Therefore, the gap 8 between the functional sub-distributors 21 may include, in addition to the power line trace gap 81, a vacant gap 82 which is not used to receive the first power line 4. The width of the vacant gap 82 may be smaller than the width of the power line trace gap 81 to reduce the length of the data distributor 2, so that the data distributor 2 can be distributed over the substrate 1.

In one example, the power line has a diameter of approximately 100 μm (micrometers), the power line trace gap 81 may have a width of 110 μm, and the vacant gap 82 may have a width of less than 100 μm. Of course, the example is merely an illustrative description. In practice, it can be set according to specific requirements.

Further, the width B of the first vacant gap 821 may be smaller than the width C of the second vacant gap 822. The first vacant gap 821 is a vacant gap 82 adjacent to the power line trace gap 81, and the second vacant gap 822 is a vacant gap 82 spaced apart from the power line trace gap 81 by at least one first vacant gap 821. In the comparison of the routing manner of the first data line 5 and the routing manner of the second data line 6 under the situation that the width of the first vacant gap and the width of the second vacant gap are equal, the second data line 6 connected to the first functional sub-distributor (the functional sub-distributor 21 between the power line trace gap 81 and the first vacant gap 821) has a greater bending degree, the second data line 6 connected to the second functional sub-distributor (other functional sub-distributor 21 except the first functional sub-distributor) has a smaller bending degree or even extend linearly. The width B of the first vacant gap 821 is smaller than the width C of the second vacant gap 822, which is particularly suitable for the scenario where the resolution of the pixels of the integrated circuit is low and the number of the functional sub-distributors 21 is fewer.

Further, a sum of a width A of a single power line trace gap 81 and a width B of a single first vacant gap 821 is approximately twice that of a width C of a single second vacant gap 822. Refer to the above example, the width of the first vacant gap 821 may be 50 μm, and the width of the second vacant gap 822 may be 80 μm. Thus, the second data line 6 connected to the first functional sub-distributor needs to be bent by a section, and then extends linearly, and the other second data lines 6 can be linearly extended, thus the wiring difficulty can be reduced and the wiring efficiency can be improved.

As shown in FIG. 4, after the second data line 6 is set, the second data line 6 may include a second data line portion 61 linearly extended. The gaps between two adjacent second data line portions 61 may be equal, thereby effectively supplying gray scale signal voltage to respective pixel electrode of the integrated circuit.

Figure 5:
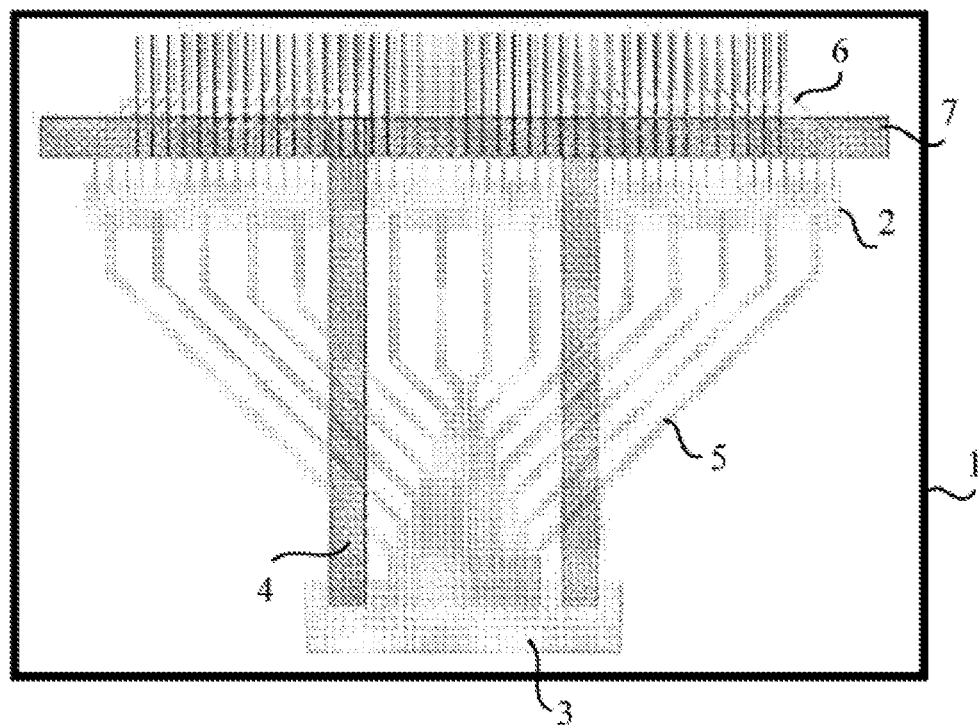
FIG. 5 is a structural schematic view of the second kind of integrated circuit provided by the embodiments of the present application.

Of course, the widths of respective vacant gap of the data distributor 2 may be substantially the same (the width of the first vacant gap is substantially the same as the width of the second vacant gap). In this case, as shown in FIG. 5, the second data line 6 can be bent as needed. Other structures in FIG. 5 (including the substrate 1, the data driver 3, the first power line 4, the first data line 5, the second power line 7, etc.) may be substantially the same as the other structures shown in FIGS. 2 to 4 which will not be described in detail here. The widths of the vacant gaps are the same, and are particularly suitable for the scenario where the resolution of the pixels of the integrated circuit is high and the number of functional sub-distributors is large.

Of course, the first vacant gap 821 and the second vacant gap 822 can also be provided in other manners, which will not be described in detail herein.

In addition, it should be noted that, as can be seen from Table 1, when the voltage of the first power line 4 changes, the parasitic capacitance of the first data line 5 also changes.

TABLE 1

| data delay | Prior art | | | the present application | | |
|---|---|---|---|---|---|---|
| | R (Ω) | C (f) | RC | R (Ω) | C (f) | RC |
| T1 | 4.38E+03 | 2.46E−11 | 1.08E−07 | 693 | 1.52E−12 | 1.05134E−09 |
| T2 | 1.00E+03 | 2.00E−14 | 2.00E−11 | 1.00E+03 | 2.00E−14 | 2E−11 |
| T3 | 3.99E+03 | 8.52E−12 | 3.40E−08 | 4201.68 | 7.91E−12 | 3.32512E−08 |

In Table 1, T1, T2 and T3 represent the voltages of the first power line 4, the voltage of T1 is greater than the voltage of T3, the voltage of T3 is greater than the voltage of T2, and the voltage of T2 is substantially zero;

R represents the resistance of the first data line 5;

C represents the parasitic capacitance of the first data line 5;

RC represents the resistance-capacitance of the first data line 5.

It can be seen from Table 1 that with the technical solution of the present application, the parasitic capacitance of the first data line 5 can be effectively reduced; as can also be seen from Table 1, due to adoption of the technical solution of the present application, the larger the voltage of the first power line 4, the more the parasitic capacitance of the first data line 5 can be reduced (relative to that of the prior art).

Figure 6:
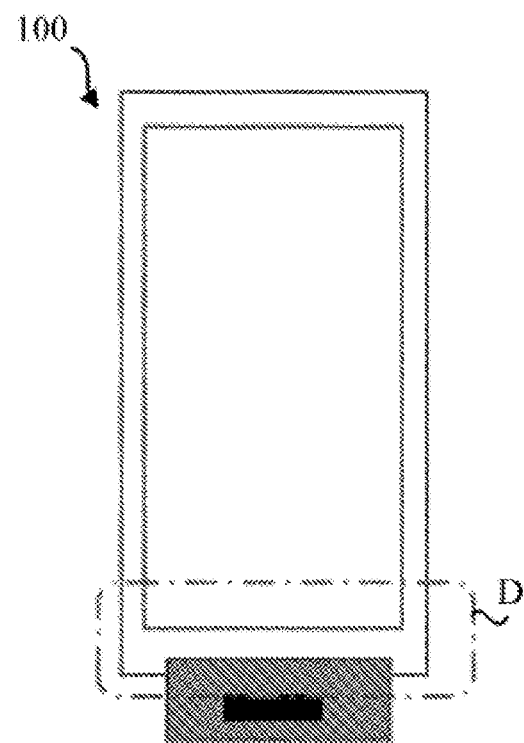
FIG. 6 is a structural schematic view of a mobile phone which is provided with an integrated circuit, provided by the embodiments of the present application.

The present application also provides a mobile phone 100 with a housing and an integrated circuit (as shown in FIG. 6, wherein enlargement of an area D is a schematic structural view as shown in FIG. 5) and a display with a housing and an integrated circuit. The integrated circuit of the mobile phone 100 and the display are disposed in the housing, and the integrated circuit is the integrated circuit mentioned above.

In the mobile phone and the display, the first power line passes through the power line trace gap inside the data distributor. Thus, the length of the intersection of the first data line and the first power line can be decreased. Since a parasitic capacitance is provided in the intersection area of the first data line and the first power line, when the intersection area of the first data line and the first power line decreases, the parasitic capacitance accumulated to the first data line can be correspondingly reduced, therefore the hindrance of the parasitic capacitance of the first data line to the data signal can be reduced, thereby the delay of the data signal can be reduced.

The above is merely the embodiments of the present application and is not intended to limit the present application. Various changes and modifications can be made to the present application by a person skilled in the art. Any modifications, equivalents, improvements, etc. made within the spirits and principles of the present application are intended to be included within the scope of the appended claims.

What is claimed is:

1. An integrated circuit, comprising:
   a substrate,
   a data distributor and a data driver distributed on the substrate, the data distributor having a power line trace gap provided therein;
   a plurality of first data lines connected to the data driver and the data distributor; and
   at least one of first power lines connected to the data driver and passing through the power line trace gap,
   wherein the data distributor comprises a plurality of functional sub-distributors distributed on the substrate and connected to the first data lines, the substrate has a plurality of wires distributed thereon, wherein two adjacent functional sub-distributors are connected to each other by the plurality of wires, and the power line trace gap is provided between two adjacent functional sub-distributors.

2. The integrated circuit according to claim 1, wherein the two adjacent functional sub-distributors has a gap defined therebetween, the gap comprises the power line trace gap and a vacant gap not provided with the first power line, and a width of the power line trace gap is larger than that of the vacant gap.

3. The integrated circuit according to claim 2, wherein a width of a first vacant gap adjacent to the power line trace gap is less than a width of a second vacant gap spaced apart from the power line trace gap by at least one of the first gaps.

4. The integrated circuit according to claim 3, wherein a sum of a width of a single power line trace gap and a width of a single first vacant gap is twice of a width of a single second vacant gap, when the width of the first vacant gap is less than the width of the second vacant gap.

5. The integrated circuit according to claim 2, wherein the width of respective vacant gap is the same.

6. The integrated circuit according to claim 1, wherein the at least one of the first power lines is configured to linearly extend and pass through the data distributor after being drawn from the data driver.

7. The integrated circuit according to claim 1, wherein the at least one of first power lines comprise at least two of the first power lines, and are integrated into one second power line after passing through the data distributor.

8. The integrated circuit according to claim 1, further comprising a plurality of second data lines connected to the data distributor and intersected with scan lines of the integrated circuit, wherein each of the second data lines comprises a second data line portion that linearly extends, the gaps between two adjacent second data line portions are the same.

9. A mobile phone, comprising a housing and an integrated circuit provided within the housing, wherein the integrated circuit is the integrated circuit according to claim 1.

10. A display, comprising a housing and an integrated circuit provided within the housing, wherein the integrated circuit is the integrated circuit according to claim 1.

* * * * *

UNITED STATES PATENT AND TRADEMARK OFFICE
CERTIFICATE OF CORRECTION

PATENT NO. : 10,733,929 B2
APPLICATION NO. : 16/322071
DATED : August 4, 2020
INVENTOR(S) : Tingting Zhang et al.

Page 1 of 1

It is certified that error appears in the above-identified patent and that said Letters Patent is hereby corrected as shown below:

On the Title Page

Item (72) replace "Yanqian Song" with "Yanqin Song".

Signed and Sealed this
Nineteenth Day of January, 2021

Andrei Iancu
*Director of the United States Patent and Trademark Office*